United States Patent
Nimbavikar et al.

(10) Patent No.: US 11,792,637 B2
(45) Date of Patent: *Oct. 17, 2023

(54) MANAGING ACTIVATION AND BRANDING OF AN ADAPTIVELY BRANDED DEVICE

(71) Applicant: T-Mobile USA, Inc., Bellevue, WA (US)

(72) Inventors: Gunjan Nimbavikar, Sammamish, WA (US); Yasmin Karimli, Kirkland, WA (US); Ryan Christopher Lindstrom, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,198

(22) Filed: Nov. 18, 2022

(65) Prior Publication Data

US 2023/0081016 A1  Mar. 16, 2023

Related U.S. Application Data

(63) Continuation of application No. 17/238,117, filed on Apr. 22, 2021, now Pat. No. 11,528,594.

(51) Int. Cl.
*H04W 8/18* (2009.01)
*H04W 60/00* (2009.01)
*H04W 8/24* (2009.01)

(52) U.S. Cl.
CPC .............. *H04W 8/18* (2013.01); *H04W 8/24* (2013.01); *H04W 60/00* (2013.01)

(58) Field of Classification Search
CPC ......... H04W 8/18; H04W 8/24; H04W 60/00; H04W 48/18; H04W 48/02; H04W 60/04
See application file for complete search history.

(56) References Cited

U.S. PATENT DOCUMENTS

| 11,528,594 B1* | 12/2022 | Nimbavikar | H04W 8/24 |
| 2010/0222047 A1* | 9/2010 | Vanderlinden | H04W 8/245 |
| | | | 455/418 |
| 2016/0049975 A1* | 2/2016 | Uy | H04W 8/205 |
| | | | 455/558 |
| 2017/0288719 A1* | 10/2017 | Kovacevic | H04W 8/183 |

* cited by examiner

*Primary Examiner* — Marisol Figueroa
(74) *Attorney, Agent, or Firm* — Barta, Jones & Foley, PLLC

(57) ABSTRACT

The disclosure herein describes the use of a policy server to enable management of activation of an adaptively branded device with a brand with which the device is compatible. A brand registration is received from a device registration entity including a device identifier of a device and a registered brand identifier of a brand. The device identifier and registered brand identifier are linked in a data store. A device activation request is received from the device including the device identifier and a SIM brand identifier of a SIM installed in the device. Based on the SIM brand identifier differing from the registered brand identifier, activation of the device with the brand is prevented. Based on the SIM brand identifier matching the registered brand identifier, the device is activated with the brand of the registered brand identifier, whereby the device is enabled to complete a branding process based on the brand.

20 Claims, 6 Drawing Sheets

MANAGING ACTIVATION AND BRANDING OF AN ADAPTIVELY BRANDED DEVICE

CROSS-REFERENCE TO RELATED APPLICATIONS

This application is a continuation of U.S. patent application Ser. No. 17/238,117 filed Apr. 22, 2021, the entirety of which is hereby incorporated by reference herein.

BACKGROUND

In many situations, modern devices such as mobile phones are manufactured and/or configured by default to be compatible with a particular brand, such that use of the device may be limited to being activated with that brand (e.g., a mobile phone may be limited to working with a particular cellular provider brand). This may even occur when a company controls multiple brands, resulting in limitations to logistics associated with manufacturing and distributing devices to merchants associated with those multiple brands, such that a merchant of a first brand that has a surplus of a device model may be unable to share those devices with a merchant of a second brand that has a need for devices of that device model (e.g., the branded configuration of the devices at the first merchant may be incompatible with the second brand).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure enable managing of activation of an adaptively branded device with a brand at least by receiving, by a processor, a brand registration message from a device registration entity, the brand registration message including a device identifier of a device and a registered brand identifier of a brand; linking, by the processor, the device identifier to the registered brand identifier in a device brand association data store; receiving, by the processor, a device activation request from the device, the device activation request including the device identifier and a subscriber identity module (SIM) brand identifier of a SIM installed in the device; based on the SIM brand identifier differing from the registered brand identifier linked to the device identifier in the device brand association data store, preventing, by the processor, activation of the device with a brand of the registered brand identifier; and based on the SIM brand identifier matching the registered brand identifier linked to the device identifier in the device brand association data store, activating, by the processor, the device with the brand of the registered brand identifier, whereby the device is enabled to complete a branding process based on the brand.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Systems and methods for managing of activation of an adaptively branded device with a brand are described. An adaptively branded device is a device which is manufactured and/or initially configured to be compatible with a plurality of different brands and that can be further adapted to be associated with and/or locked with a single brand of that plurality of different brands based on an activation and branding process. The described systems and methods include a brand registration being received from a device registration entity including a device identifier of a device and a registered brand identifier of a brand. The device identifier and registered brand identifier are linked in a data store. A device activation request is received from the device including the device identifier and a SIM brand identifier of a SIM installed in the device. Based on the SIM brand identifier differing from the registered brand identifier, activation of the device with the brand is prevented. Based on the SIM brand identifier matching the registered brand identifier, the device is activated with the brand of the registered brand identifier, whereby the device is enabled to complete a branding process based on the brand.

The disclosure enables dynamic, flexible branding of devices at time of purchase. Users of newly purchased devices are provided with a fully branded out of box experience (OOBE) based on the described registration and activation processes. Merchants and/or other device distributors are provided with simplified logistics and inventory management of the adaptively branded devices, as a device model may be identified by a universal stock keeping unit (SKU) or other model identifier. Device distributors of different brands are further enabled to flexibly transfer the adaptively branded devices between each other as necessary to maintain desired inventory levels. The disclosure operates in an unconventional way by allowing the devices to be brand agnostic after manufacturing while still being locked into a subset of brands, protecting any subsidy locks associated with those brands. Upon the described activation process, the devices become branded and locked into the specific brand in which it is sold. Further, a company that controls multiple brands is enabled to source a single device model to serve all brands. Sourced devices may be configured to be compatible with all brands of the company and then, at point of purchase, registered and activated with a specific brand as selected by the customer. These features enable businesses to buy more devices for less, increase inventory flexibility, and better serve customers. Such businesses are provided more flexibility and cost savings through volume ordering of fewer device models and the ability to transfer devices between brands as needed.

Figure 1:
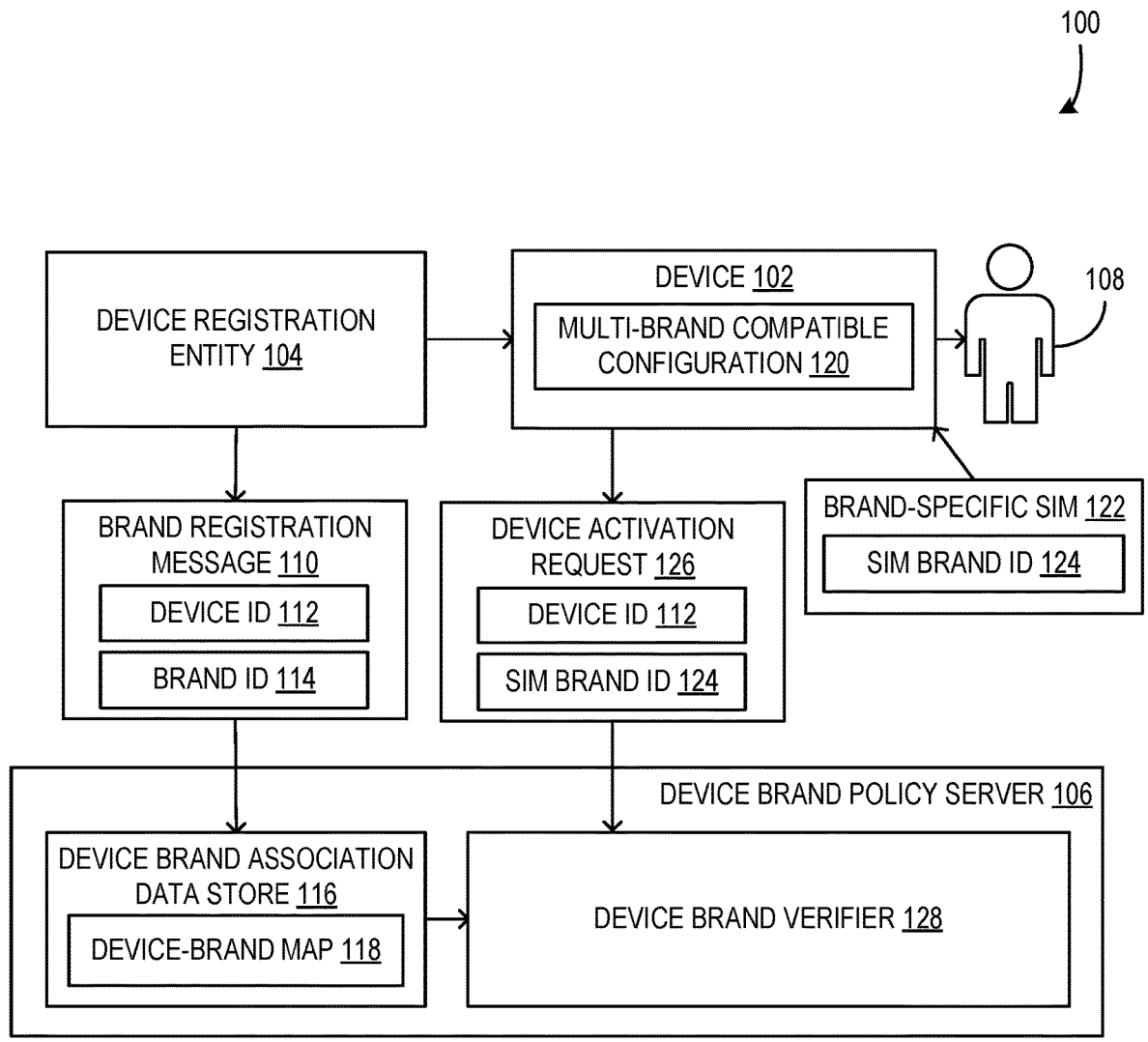
FIG. 1 is a block diagram illustrating a system for registering and activating a device using a device brand policy server according to an embodiment.

FIG. 1 is a block diagram illustrating a system 100 for registering and activating a device 102 using a device brand policy server 106 according to an embodiment. In some examples, the device 102 is sold or otherwise distributed by a device registration entity 104, such as a merchant that sells mobile phones and/or other devices, to a user 108. The device registration entity 104 is further configured to register the device 102 with the device brand policy server 106 using a brand registration message 110. A brand-specific subscriber identity module (SIM) 122 is installed in the device 102 and a device activation request 126 is sent from the device 102 to the device brand policy server 106 to request activation of the device 102. The device brand policy server 106 evaluates the device activation request 126 to determine whether the activation process of the device 102 with the brand of the brand-specific SIM 122 continues.

In some examples, the device 102 includes hardware, firmware, and/or software that enables a user 108 of the device 102 to interact with the device 102, input data into interfaces of the device 102, obtain data from interfaces the device 102, and/or cause the device 102 to communicate with other devices via networks (e.g., cellular networks, Wi-Fi networks, the Internet, BLUETOOTH network connections, near field communication (NFC) network connections). The device 102 may include a cellular phone device, a tablet device, a phablet device, a laptop computing device, a personal computer device, another type of mobile device, etc. Further, device 102 is an "adaptively branded device" configured using a multi-brand compatible configuration 120, such that the device 102 is compatible with activation with respect to a plurality of different brands (e.g., a mobile phone device that is compatible with a variety of cellular service carrier brands). The multi-brand compatible configuration 120 may include configured parts of the device 102 that are hardware parts, firmware parts, and/or software parts. The device 102 may be configured with the multi-brand compatible configuration 120 at or by the device registration entity 104 and/or at an original equipment manufacturer (OEM) (e.g., a mobile phone device factory). The device 102 may be configured as a defined device model and/or type associated with a model identifier (e.g., a stock keeping unit (SKU) data value or other inventory-based identification value), such that each device associated with the model identifier that includes a multi-brand compatible configuration 120 is referenced by the model identifier, regardless of which brand with which the devices eventually become activated. Such a universal model identifier (e.g., a "universal SKU" or "brand-agnostic SKU") may be used by merchants or other device registration entities associated with any of the brands of the set of brands with which the associated devices are compatible, enabling a more efficient, flexible distribution of devices from manufacturers and between device registration entities.

Further, in some examples in which the device 102 is a mobile phone device or other mobile device, the multi-brand compatible configuration 120 includes a configuration of radio technologies (e.g., fifth-generation (5G) stand-alone (SA)/not-stand-alone (NSA), fourth-generation (4G) long term evolution (LTE), third-generation (3G), second-generation (2G)), radio bands (e.g., one or more brand-specific hardware, firmware, and/or software specifications), core services (voiceover LTE (VoLTE), rich communication services (RCS), Global System for Mobile Communications Association (GSMA) IR.94, Wi-Fi Connection (WFC)), regulatory configurations (e.g., wireless emergency alerts (WEA), real-time text (RTT), enhanced 911 (E911), assisted global positioning system (AGPS)), subsidy lock configurations, carrier identifier (ID) configurations, and unlock tool configurations that are compatible with all brands with which the multi-brand compatible configuration 120 is associated. For instance, if the device 102 is configured to be compatible with three different brands, all the described features of the device 102 are configured to be compatible with each of those three different brands.

Additionally, or alternatively, the multi-brand compatible configuration 120 may configure the device 102 to reject any brand-specific SIMs 122 that are associated with brands outside of the set of brands with which the multi-brand compatible configuration 120 is associated (e.g., brands that are competitors of the set of brands, mobile virtual network operator (MVNO) brands, or the like). For instance, if the multi-brand compatible configuration 120 configures the device 102 to be compatible with a set of three different brands: Brand A, Brand B, and Brand C, the multi-brand compatible configuration 120 may further configure the device 102 to reject or otherwise prevent activation of the device with respect to installed SIMs associated with brands other than brands A, B, or C. Such a rejection may occur upon the user 108 requesting activation of the device 102 after installation of the incompatibly branded SIM and prior to a device activation request 126 being sent to the device brand policy server 106.

In some examples, the device registration entity 104 includes a merchant or other vendor that sells or distributes the device 102 to user 108 and/or other similar devices to other users. Additionally, the device registration entity 104 may be configured to communicate with the device brand policy server 106 via a network connection or the like. The device registration entity 104 may be associated with a particular brand or brands of the set of brands for which the device 102 is compatible based on the multi-brand compatible configuration 120. Based on the device 102 being distributed to the user 108 at or by the device registration entity 104, the device registration entity 104 sends a brand registration message 110 to the device brand policy server 106. The brand registration message 110 includes a device ID 112 that identifies the device 102 (e.g., an international mobile equipment identity (IMEI)) and a brand ID 114 that identifies the brand with which the device 102 is being registered. In cases where the device registration entity 104 is associated with one brand, the brand ID 114 identifies that brand. Alternatively, in cases where the device registration entity 104 is associated with a set of multiple brands, the brand ID 114 may be chosen or selected by the user 108 and/or by the entity 104 or a user associated therewith from that set of brands. The brand registration message 110 may further include data that is used to verify and/or otherwise confirm that the message 110 is sent from the entity 104, which may be trusted by the device brand policy server 106 for the purpose of registering devices with brands (e.g., encrypted data that can be decrypted at the server 106 or the like).

Additionally, or alternatively, registration message 110 may include additional data associated with the transaction between the device registration entity 104 and the user 108 for the device 102. For instance, the transaction results in a need to enforce a subsidy lock with respect to the device, the brand registration message 110 may include data indicating that such a subsidy lock should be used with the device 102. Other related data may include an expiration date of such a subsidy lock.

In some examples, the device brand policy server 106 includes hardware, firmware, and/or software configured for communicating with device registration entities and associated devices, updating and maintaining device-brand registration associations, and evaluating device activation requests from devices as described herein. The device brand policy server 106 may receive the brand registration message 110 from the device registration entity 104 and update the stored device-brand registration associations (e.g., the device-brand map 118 that maps device IDs to brand IDs based on registration messages received) of the device brand association data store 116 stored in or otherwise associated with the device brand policy server 106. Further, the device brand policy server 106 may be configured to verify or otherwise confirm that the brand registration message 110 is from a trusted entity prior to updating the device-brand map 118 in the data store 116, such that the associations stored in the device brand association data store 116 reflect only associations made by trusted entities (e.g., a user outside of a trusted device registration entity is not able to register a device with a brand on the device brand policy server 106).

Additionally, the device brand policy server 106 is configured to receive device activation request 126 from the device 102 based on the brand-specific SIM 122 being installed on the device 102 and on the user 108 selecting to proceed with activation of the device 102. The device activation request 126 includes the device ID 112 of the device 102 and the SIM brand ID 124 of the installed brand-specific SIM 122. In some examples, the device activation request 126 includes a SIM ID that specifically identifies the installed brand-specific SIM 122, and that SIM ID is associated with the specific brand of the SIM 122, such that the SIM ID can be used to determine the brand ID of the SIM 122. In such cases, the SIM ID may be included as an effective SIM brand ID, such that the device brand policy server 106 is configured to use the received SIM ID to look up the brand ID with which the SIM is associated. Alternatively, or additionally, the SIM brand ID 124 may be included in the request 126 along with the SIM ID such that the look up of the brand ID is unnecessary. Such verification of the brand ID may still be performed as an additional step to secure the device activation process (e.g., the device brand policy server 106 may verify that the received SIM brand ID 124 matches a brand ID with which the SIM ID is associated based on verification with a trusted source).

Based on receiving a device activation request 126 from the device 102, the device brand verifier 128 of the device brand policy server 106 verifies or otherwise confirms that the activation of the device 102 in association with the SIM brand ID 124 should proceed. In some examples, the device brand verifier 128 is configured to receive the device ID 112 and SIM brand ID 124 from the device activation request 126, identify a device-brand association in the device-brand map 118 of the device brand association data store 116 based on the received device ID 112, determine a brand ID 114 of the identified device-brand association, and compare the determined brand ID 114 to the SIM brand ID 124. If those compared brand ID's match, the device brand verifier 128 is configured to verify that the activation of the device 102 may proceed. Alternatively, if the compared brand IDs do not match, the device brand verifier 128 is configured to prevent the activation of the device 102 from proceeding. The processes involved with either proceeding with the activation of the device 102 or preventing the activation from proceeding are described in greater detail below with respect to FIG. 2. Further, the evaluation of the device activation request 126 by the device brand verifier 128 may be based on other factors without departing from the description herein.

Figure 2:
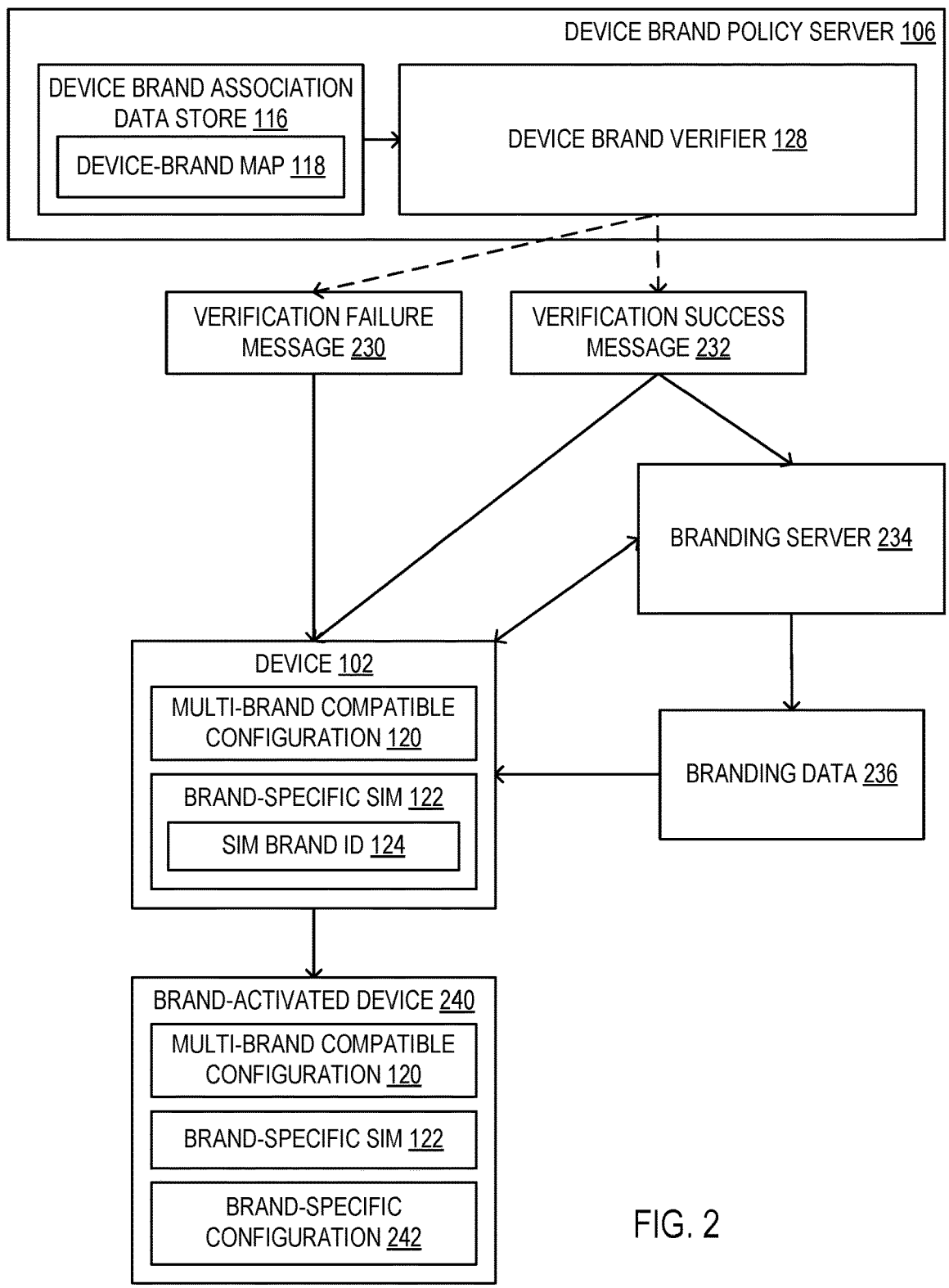
FIG. 2 is a diagram illustrating a system for completing a brand-specific device activation process according to an embodiment.

FIG. 2 is a diagram illustrating a system 200 for completing a brand-specific device activation process according to an embodiment. In some examples, the system 200 is substantially the same as system 100 of FIG. 1 after the device brand policy server 106 has received the device activation request 126 and the device brand verifier 128 has either verified that the activation of the device 102 may proceed or that the activation of the device 102 is prevented from proceeding. If the device brand verifier 128 determines that the activation should be prevented, a verification failure message 230 is generated and provided to the device 102. Alternatively, if the device brand verifier 128 determines that the activation should proceed, a verification success message 232 is generated and provided to the device 102 and/or a branding server 234.

In examples where the activation of the device 102 is prevented, the device 102 receives the verification failure message 230 and processes it. In some examples, the device 102 is configured to display a message associated with the verification failure to a user (e.g., user 108) of the device (e.g., a message indicating that the SIM brand ID does not match the registered brand ID of the device). Further, the device 102 may prompt the user to take some corrective action, such as replacing the SIM installed in the device with a different SIM and/or reregistering the device 102 with a different brand via a device registration entity (e.g., device registration entity 104. Additionally, it should be understood that the branding servers 234 associated with the SIM brand ID 124 or the registered brand ID of the device (e.g., the brand ID 114 stored in the device brand association data store 116) are not provided verification that the activation of the device 102 should proceed and, as a result, the device 102 is prevented from taking the next steps of the activation process that rely on a branding server 234 as described herein.

For instance, a user may purchase a device at a merchant that sells devices in association with Brand A. During the device purchasing process, the merchant, acting as a device registration entity for Brand A, registers the device being purchased with Brand A at a device brand policy server 106 that is associated with a plurality of brands, including Brand A. The purchasing user then mistakenly installs a SIM associated with Brand B and attempts to activate the device. The device includes a multi-brand compatible configuration, such that it is compatible with both Brand A and Brand B and, as a result, a device activation request to the device brand policy server is triggered when the user turns on or otherwise interacts with the device after installation of the SIM. Because the device brand policy server has recorded the device as being registered with Brand A and the device activation request from the device includes a SIM brand ID for Brand B, the device brand verifier of the device brand policy server determines that activation of the device with Brand B should be prevented and a verification failure message is generated and provided to the device. A message is displayed to the user that indicates that the installed SIM does not match the brand with which the device has been registered and prompts the user to replace the SIM with a matching SIM. As a result of the message, the user corrects their mistake and installs a SIM associated with Brand A. The user then restarts the activation process and the device brand verifier determines that the activation should proceed based on the registered brand of the device matching the brand of the installed SIM.

In examples where the activation of the device proceeds based on the determination of the device brand verifier 128 of the device brand policy server 106, the verification success message 232 is generated and provided the device 102 and/or a branding server 234 that is associated with the brand of the device 102 being activated (e.g., the SIM brand ID 124 and the registered brand ID 114, which match as determined by the device brand identifier 128). The verification success message 232 may include data that indicates that the device is approved to be activated with the brand, such as the device ID (e.g., device ID 112) that identifies the device 102 to the branding server 234 and data that enables the branding server 234 to verify that the verification success message 232 has been sent by the device brand policy server 106, which is trusted by the branding server 234, such as data encrypted by the device brand policy server 106 that may be decrypted and verified by the branding server 234 (e.g., a digital signature of the device brand policy server 106 or other cryptographic system or arrangement).

Additionally, or alternatively, the verification success message 232 may include or be sent with data to the device 102 that further configures the device 102 (e.g., policy data or brand-specific data that is used during the activation of the device 102). For instance, brand-specific network configuration data may be provided to the device 102 with the verification success message 232. Alternatively, such data may be provided by the branding server 234 in the branding data 236 that it provides to the device 102.

In some examples, the branding server 234 includes hardware, firmware, and/or software configured for performing device activation operations that include providing branding data 236 to device 102 and/or other devices that are being activated. The branding server 234 may be associated with one brand or with multiple brands. The branding data 236 provided to the device 102 by the branding server 234 may be brand-specific to the brand with which the device 102 is being activated. In cases where the branding server 234 is associated with a single brand, the branding server 234 provides branding data 236 associated with that brand. Alternatively, in cases where the branding server 234 is associated with multiple brands, the branding server 234 may determine branding data 236 to provide to the device 102 based on a brand ID included in the verification success message 232 and/or received from the device 102 during the activation process.

Further, the device 102 and branding server 234 may be configured to communicate with each other via a network or networks. The communication between them may be facilitated by the device brand policy server 106 based on the provided verification success message 232. For instance, the verification success message 232 may include or otherwise be sent with network communication data to the device 102, wherein that network communication data may be used by the device 102 to connect to and/or communicate with the branding server 234. Alternatively, or additionally, the branding server 234 may be configured to initiate communication with the device 102 based on network communication data included or otherwise provided with the verification success message 232 sent to the branding server 234.

In some examples, the branding server 234 is configured to provide the branding data 236 to the device 102 and that branding data 236 is configured to enable the device 102 to complete the activation process with respect to the brand with which the branding data 236 is associated (e.g., the brand of the brand-specific SIM 122 installed on the device 102). The branding data 236 may include data that is used to configure the settings of the device 102 (e.g., settings or configuration data that controls how the device 102 connects to brand-specific networks), data that is used to install brand-specific applications or other software (e.g., apps that give users access to brand-specific application store or brand-specific cloud storage, apps that are compatible to all brands may be configured to provide brand-specific user experiences), and/or data that is used to configure user interfaces and/or visual aspects of the device configuration (e.g., brand-specific color schemes, brand-specific icons, brand-specific font configurations, brand-specific animations, brand-specific interface conventions, such as button shape, location, or the like). Additionally, or alternatively, the branding data 236 may include data that configures the device 102 to be locked to the brand of the branding data 236, such that it is prevented from being used with other brands for which it may be originally compatible via the multi-brand compatible configuration 120.

Further, in some examples, the branding data 236 includes data used by the device 102 to provide the user with a brand-specific "out of box experience" (OOBE) during the activation and set up of the device 102. The OOBE of the device 102 may include brand-specific graphical user interfaces (GUIs) displayed to the user during setup and use of the device 102, brand-specific activation process prompts or messages displayed to the user, brand-specific steps or processes performed on the device 102 during the activation and setup process, brand-specific default settings and/or configuration of the device 102, or the like.

In other examples, more, fewer, or different types of branding data may be used during activation of the device 102 with a specific brand without departing from the description.

Based on completion of the activation of the device 102 with the brand of the brand-specific SIM 122, the device 102 becomes a brand-activate device 240. The brand-activated device 240 includes the multi-brand compatible configuration 120 with which it was originally configured, the brand-specific SIM 122, and brand-specific configuration 242 with which the device 240 was configured during the brand activation process as described herein. The brand-activated device 240 is activated and ready to use by a user (e.g., a brand-activated mobile phone device may be configured to access a brand-specific cellular data network, make phone calls using that network, access the Internet via that network or a Wi-Fi network connection, or the like). In some examples, the brand-specific configuration 242 includes one or more software components or modules of the multi-brand compatible configuration 120 that have been activated during the activation process, wherein such components or modules are specific to the brand for which the device has been activated. Further, the branding of the device 102 may include value-added services (VAS) based on the specific brand. For instance, various branding schema may be deployed or installed to the device 102 based on the make and model of the device as well as the sales channel through which it was purchased. Branding may further be applied to applications or other software of the device 102 to provide a brand-specific user experience.

Figure 3:
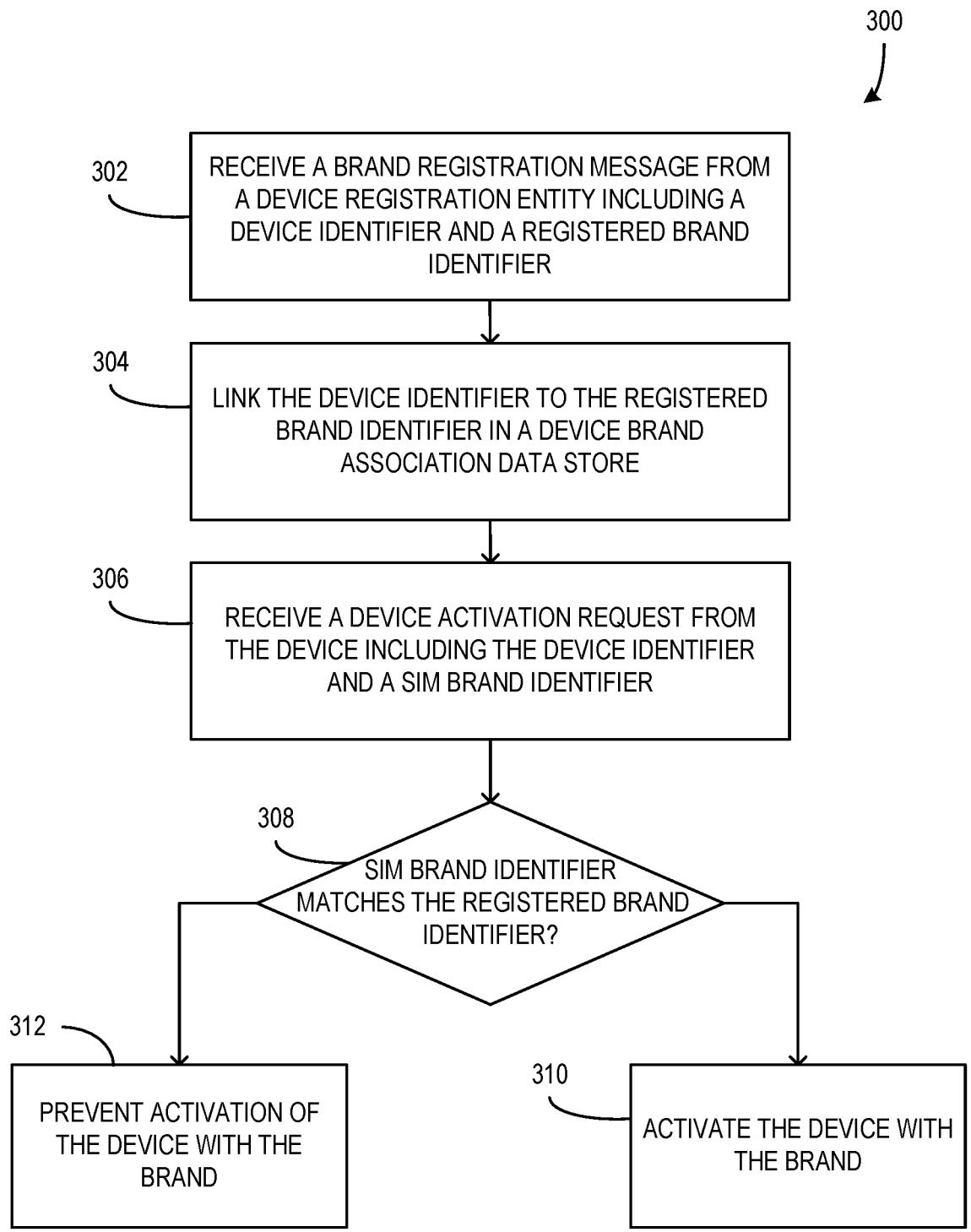
FIG. 3 is a flowchart illustrating a process of registering and activating a device with a brand according to an embodiment.

FIG. 3 is a flowchart illustrating a process 300 of registering and activating a device (e.g., device 102) with a brand according to an embodiment. In some examples, the process 300 is executed or otherwise performed by a system (e.g., system 100) and/or entities within a system (e.g., the device brand policy server 106 in system 100). At 302, a brand registration message (e.g., brand registration message 110) is received from a device registration entity (e.g., device registration entity 104). The brand registration message includes a device identifier of the device and a registered brand identifier that identifies a brand with which the device is to be registered. The brand registration message may further include information or data that verifies the identity of the device registration entity as an entity that is trusted by the device brand policy server receiving the message, such that the device brand policy server is enabled to confirm the identity of the device registration entity prior to recording the registration of the device with the identified brand. For instance, a merchant that sells mobile phones in association with one or more brands may send a brand registration message to a device brand policy server when selling a mobile phone to a user. The brand registration message may include a device identifier of the mobile phone being sold and a registered brand identifier of a brand to which the user will subscribe with the mobile phone. If the merchant is associated with multiple brands, the user may be enabled to select one of the brands from the multiple brands and the merchant may send the brand identifier of the selected brand in the brand registration message.

At 304, the device identifier (e.g., device ID 112) and the registered brand identifier (e.g., brand ID 114) are linked in a device brand association data store. In some examples, the device brand policy server confirms that the received brand registration message is from a trusted entity and/or from an entity that is allowed to register devices with brands with respect to the device brand policy server and, based on the confirmation of the entity that is the source of the brand registration message, the device brand policy server links the device identifier and the registered brand identifier in a data store (e.g., the device brand association data store 116 and/or the device-brand map 118 stored therein), thus registering the device identified with the device identifier to the brand associated with the registered brand identifier. The established registration relationship between the device and the brand may be used during the activation process of the device as described herein.

At 306, a device activation request (e.g., device activation request 126) is received from the device, the request including the device identifier (e.g., device ID 112) and a SIM brand identifier (e.g., SIM brand ID 124). In some examples, the device activation request is received from the device upon the installation of a SIM card or the like into the device. For instance, upon purchasing a mobile phone, the purchasing user may install a brand-specific SIM card into the purchased device and then turn the device on, causing a device activation request to be automatically sent to the device brand policy server over a network connection. Alternatively, if no network connection is immediately available, the activation process of the device may be paused until a network connection with the device brand policy server can be established. Further, the user may be enabled to select to proceed with the activation process. If the user selects to not proceed at this time, the functionality of the device may be significantly limited, including preventing the device from accessing a brand-specific data network, brand-specific software, or other important device functionality.

At 308, if the SIM brand identifier matches the registered brand identifier, the process proceeds to 310. Alternatively, if the SIM brand identifier differs from the registered brand identifier, the process proceeds to 312. In some examples, upon receiving the device activation request, the device brand policy server accesses the registered brand identifier from the device brand association data store based on the device identifier included in the device activation request. Then, the policy server compares the SIM brand identifier of the device activation request to the accessed registered brand identifier from the data store. Further, other methods of verification or confirmation of the device being activated may be applied to the device without departing from the description.

At 310, the device is activated with the brand. In some examples, activating the device with the brand includes sending a verification success message (e.g., verification success message 232) to the device and/or a branding server. The branding server may then complete activation and branding of the device by providing branding data (e.g., branding data 236) to the device, resulting in a brand-activated device (e.g., brand activated device 240) that enables full functionality of the device and provides a user of the device a brand-specific user experience of the device. Further, the activation of the device may include interactions between the device and the branding server, such that the device is enabled to request brand-specific data from the branding server and/or provide notification of the state of the device to the branding server.

At 312, if the SIM brand identifier does not match the registered brand identifier at 308, activation of the device with the brand is prevented. In some examples, the activation of the device is prevented by sending a verification failure message (e.g., verification failure message 230) to the device. Such a message may cause the device to notify the user of the device that the activation has failed and/or prompt the user to take action to correct the issue, such as prompting the user to replace the SIM with a SIM from the brand of the registered brand identifier and/or prompting the user to reregister the device with the brand of the SIM brand identifier at a trusted device registration entity. Additionally, in some examples, complete activation of the device with the brand requires that branding process be performed by a branding server on the device as described herein. Based on the SIM brand identifier and the registered brand identifier not matching at 308, the device brand policy server refrains from verifying the activation process of the device to the associated branding server, such that the branding server is prevented from proceeding with the required branding process.

Further, in some examples, the device is an "adaptively branded device, configured to be compatible with a plurality of brands prior to it being sold or otherwise transferred to a user and/or registered with a single brand. For instance, a cellular network service provider may include or otherwise manage three brands via which it provides cellular service to subscribers. The service provider may direct the manufacture of mobile phones that are originally configured to be compatible with all three brands such that distributors of each brand can order that model of mobile phone (e.g., the model may be identified using a universal SKU or the like) to sell in in stores, on the web, or the like. In such examples, at 308, the SIM brand identifier may be further compared to brand identifiers of the plurality of brands with which the device is configured to be compatible and activation of the device is completed when the SIM brand identifier matches one of the brand identifiers of that plurality of brands. Additionally, or alternatively, the device itself may be configured to compare the SIM brand identifier of a SIM when it is installed with the brand identifiers of brands with which the device is compatible. In such cases, the device may be configured to reject the installation of a SIM with a brand identifier that differs from the brand identifiers of the brands with which the device is compatible. For instance, installing a SIM that is not associated with a compatible brand may result in the device notifying the user that activation cannot proceed due to the SIM and/or prompting the user to remove the SIM and/or install a different SIM that is compatible with the brands of the device.

In some examples, the device is configured to include a subsidy lock that prevents the device from being used with unapproved brands based on terms and conditions of contracts made between a device merchant and a device purchasing user. For instance, a user may purchase a device from a merchant associated with a brand and the merchant may provide the user with a discount or other subsidy on the purchase in exchange for the user agreeing to use the device with the brand of the merchant for a period. In other examples, such terms and conditions may include more, fewer, or different requirements without departing from the description. A subsidy lock of the device may include hardware, firmware, and/or software of the device that is used to enforce the terms and conditions of such a contract. The device may include a subsidy lock allowed list of brands upon being manufactured and/or initially configured and, based on being activated with a specific brand, the subsidy lock allowed list may be adapted to only include that specific brand. As a result, the device is locked into that brand via the subsidy lock.

Additionally, or alternatively, the subsidy lock of the device may be released or removed when the terms and conditions of the device purchase are met. For instance, once a user has used a device with the agreed-upon brand for the period of the contract, the device may be unlocked, enabling the user to switch to any brand of service provider with their device.

Further, in some examples, after activation of the device with the brand is prevented at 312, a second device activation request from the device is received that includes the device identifier and a second SIM brand identifier of a second SIM installed in the device (the user may have replaced the original SIM with the second SIM). Based on the second SIM brand identifier matching the registered brand identifier linked to the device identifier in the device brand association data store at 308, the process may then proceed to 310, wherein the device is activated with the brand of the registered brand identifier.

Additionally, or alternatively, a user of a brand-activated device may perform a "factory reset" of the device. Upon using the device after the reset, the device may require reactivation. A second device activation request may be received from the device based on the device being reset to factory default configuration, wherein the request includes the device identifier and the SIM brand identifier of the SIM installed in the device. The SIM brand identifier is once again compared to the registered brand identifier as described herein and, if they match, the activation of the device proceeds and is completed. Thus, resetting the device to factory default configuration does not result in enabling a user of the device to activate it with a different brand due to the registered association between the device and brand in the device brand policy server.

In some examples, activating the device at 310 further includes performing a branding process based on the brand of the registered brand identifier, wherein the branding process includes at least one of the following: activating a brand-specific software component of the device, installing brand-specific software to the device, and configuring brand-specific user experience features of the device.

Figure 4:
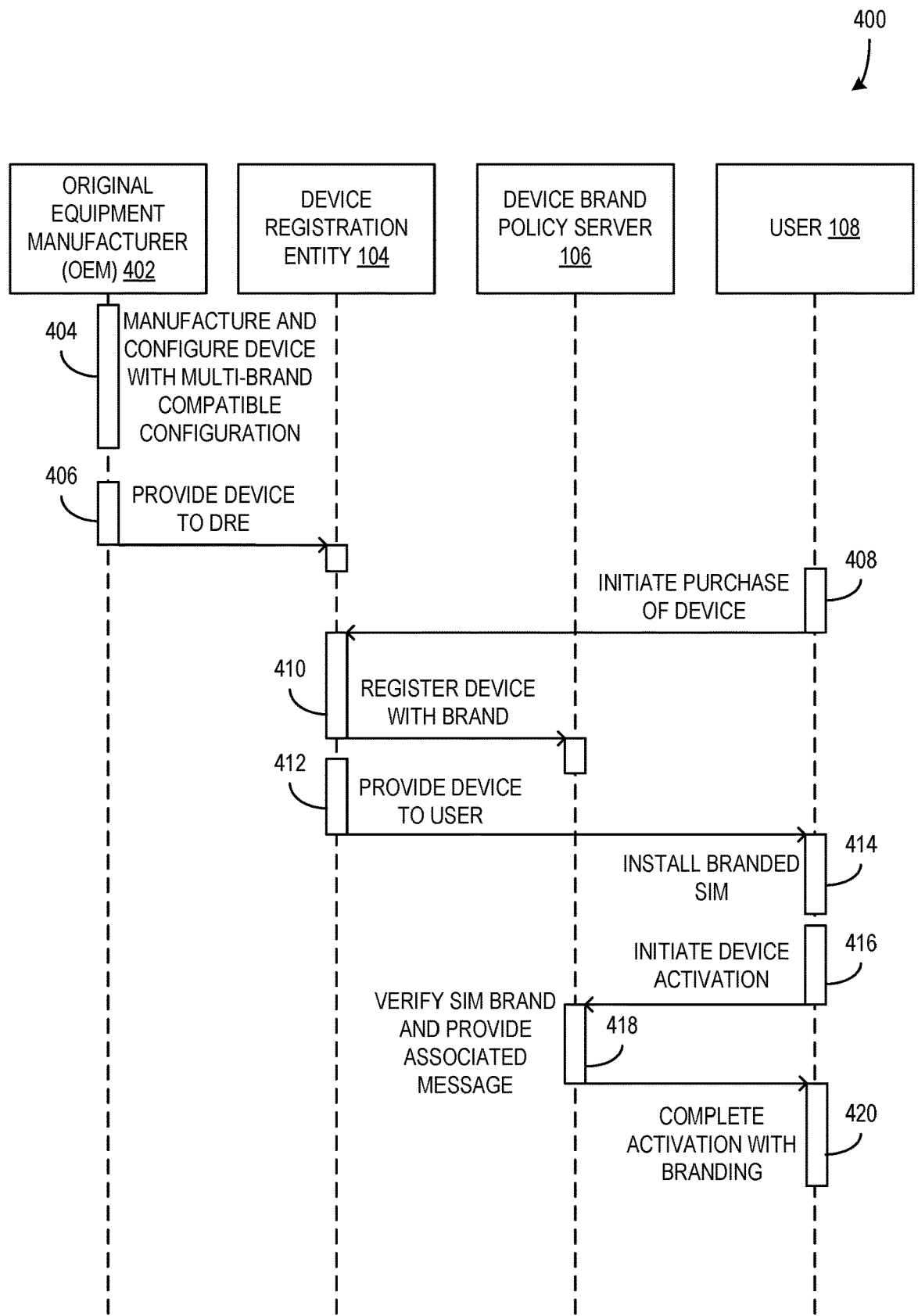
FIG. 4 is a diagram illustrating interactions during a process of registering an activating a device with a brand according to an embodiment.

FIG. 4 is a diagram illustrating interactions during a process 400 of registering an activating a device with a brand according to an embodiment. In some examples, the process 400 is executed or otherwise performed by a system (e.g., system 100) and/or entities within a system (e.g., the device brand policy server 106 in system 100). An original equipment manufacturer (OEM) 402 manufactures and/or configures a device with a multi-brand compatible configuration (e.g., multi-brand compatible configuration 120) at 404. At 406, the OEM 402 provides the device to the device registration entity 104. In some examples, the device registration entity 104 is a merchant associated with a brand in the set of brands of the multi-brand compatible configuration of the device. The model of the device is identified by a universal model identifier or universal SKU, such that the merchant is enabled to order a set of devices of the universal model identifier, regardless of the brand with which the merchant is associated. Additionally, merchants of different brands are enabled to order sets of devices using the same universal model identifier, so long as the merchants are associated with at least one brand of the set of brands of the multi-brand compatible configuration.

At 408, a user 108 initiates a purchase of a device from the device registration entity 104. At 410, based on the initiated purchase, the device registration entity 104 registers the device being purchased with the brand at the device brand policy server 106. In some examples, such a registration includes the device brand policy server 106 linking the device identifier of the device with the brand identifier of the brand to which the device is being registered as described herein.

At 412, the device registration entity 104 provides the device to the user 108 and, at 414, the user installs a branded SIM into the device. The branded SIM may be associated with the brand with which the device was previously registered. The user 108 then initiates activation of the device in association with the brand of the SIM. As a result of the initiation of the activation process, the device interacts with the device brand policy server 106 to verify the SIM brand and provide an association success or failure message at 418. The device brand policy server 106 may be configured to compare the registered brand identifier associated with the device to the SIM brand identifier provided by the device as described herein. If the SIM brand is verified, a success message may be sent to the device and the user 108. Alternatively, if the SIM brand is not verified, a failure message may be sent to the device and the user 108 and/or the device may otherwise be prevented from completing activation.

At 420, if the SIM brand is verified at 418, the device and user 108 complete the activation of the device and associated branding of the device. In some examples, completing the activation of the device includes branding the device via a branding server and associated branding data as described herein.

Figure 5:
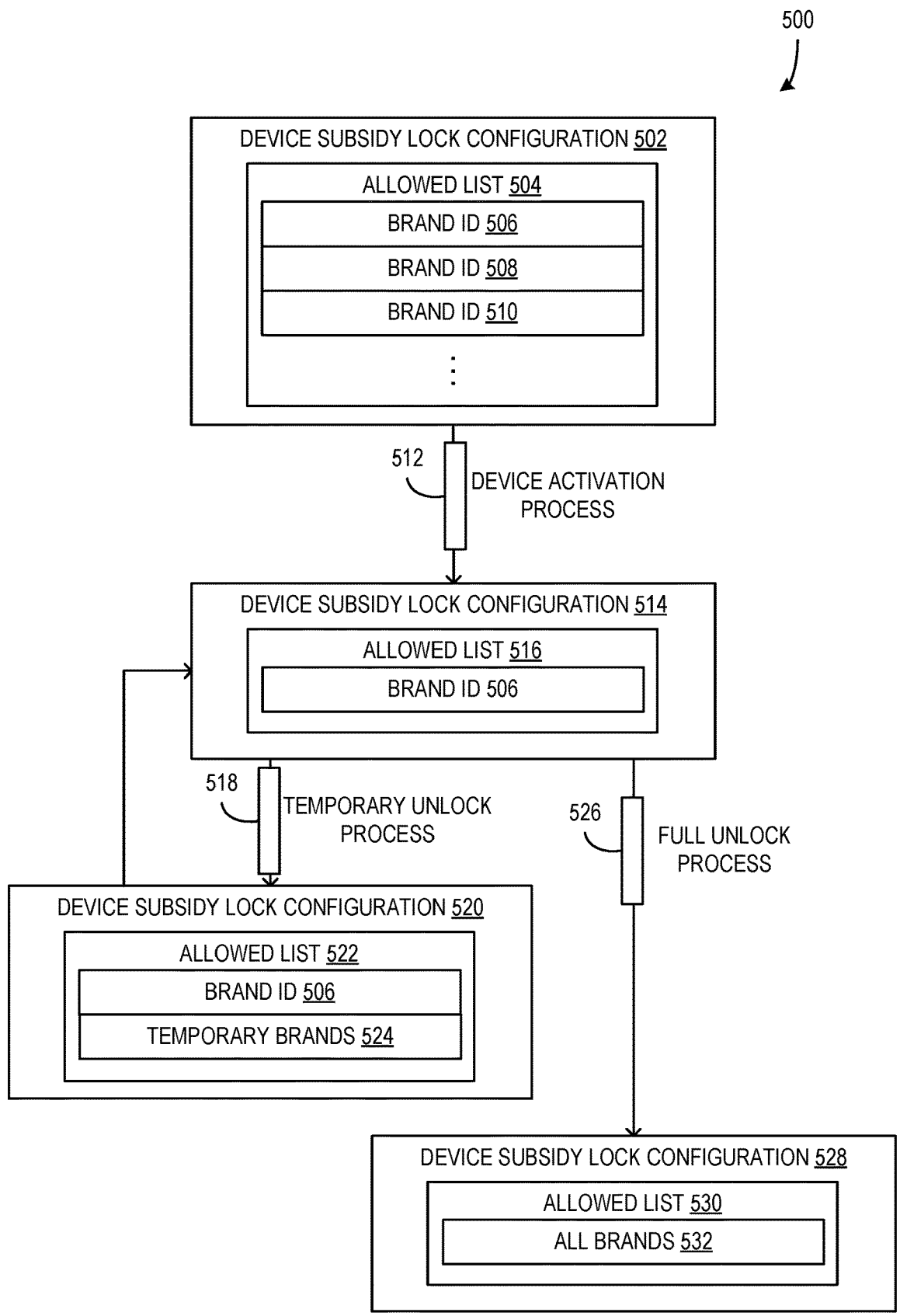
FIG. 5 is a state diagram illustrating subsidy lock configurations of a device according to an embodiment.

FIG. 5 is a state diagram illustrating subsidy lock configurations 502, 514, 520, and 528 of a device (e.g., device 102) according to an embodiment. In some examples, subsidy lock configurations of a device are managed by a system (e.g., system 100) and/or entities within a system (e.g., the device brand policy server 106 in system 100). Further, the subsidy lock configurations may be in the form of data stored and/or processed on the device and/or data stored and/or processed on a server or other entity that is separate from the device but in communication with the device (e.g., the device brand policy server 106 or other similar entity). Changes to the subsidy lock configuration of a device may be pushed to or otherwise provided to that device at any time from an associated server to enable the configuration state changes described herein. Further, enforcement of the subsidy lock configuration of a device may be based on configuring the device to only function with an installed SIM that matches the brands in the allowed list of the subsidy lock configuration. Additionally, or alternatively, other methods of enforcing a subsidy lock configuration may be used without departing from the description.

In some examples, the process of configuring a device such as device 102 to be compatible with and/or locked to multiple brands or a single brand includes configuring and enforcing a subsidy lock on the device 102 and/or with respect to the device 102. Such a subsidy lock configuration configures the device 102 such that it cannot be used with brands other than those brands with which the subsidy lock is associated. For instance, if the multi-brand compatible configuration 120 is configured to enable the device 102 to be used with a set of three brands, the device subsidy lock configuration 502 of the device 102 may include an allowed list 504 or other similar data structure that identifies each of the brands of the set of three brands (e.g., brand ID 506, brand ID 508, and brand ID 510). The brands on the allowed list may be identified by brand IDs, as illustrated, and those brand IDs may include public land mobile network (PLMN) IDs, mobile network code (MNC) IDs, mobile country code (MCC) IDs, group identifier (GID) IDs, and/or some combination thereof (e.g., a PLMN allowed list may include a list of MNC–MCC+GID combinations where each value of the combination must be met for the device 102 to use the associated SIM). In such examples, when the device is activated with a specific brand and locked to the brand via a device activation process 512 as described herein, as part of the branding process, the device subsidy lock configuration 514 and associated allowed list 516 of the device 102 is updated to include only the brand ID 506 of the brand to which the device 102 is now locked. Additionally, or alternatively, the allowed list may be expanded (e.g., if an allowed brand splits into two separate brands that are both to be allowed) or otherwise adapted or changed in other situations. A device subsidy lock configuration may be used with a device 102 to ensure that the user purchasing the device 102 complies with the terms and conditions of the purchase of the device 102 (e.g., if the user has received a discount on the purchase of the device 102 in exchange for a promise to subscribe to a brand for two years, the subsidy lock may configure the device to be locked into the brand for those two years, preventing the user from changing to a different brand in that period).

Further, in some examples, a device 102 that is locked to one brand is temporarily or fully unlocked from a subsidy lock configuration 514 of the brand based on defined circumstances. For instance, if a user of the device 102 intends to travel internationally, the user may request a temporary unlock process 518 for the device 102 such that they are enabled to use the device 102 in other countries where they would not have access to the network of the brand to which their device 102 is currently locked. In such cases, the configuration of the device 102 is adapted to be a device subsidy lock configuration 520 with an allowed list 522 that includes the current brand ID 506 and any other temporary brands 524 that may be allowed during the temporary period (e.g., brands that are available where the user is traveling). After the temporary period expires, the configuration of the device 102 may revert to device subsidy lock configuration 514.

Additionally, or alternatively, when the terms and conditions associated with the purchase of the device 102 are satisfied (e.g., the user has made a defined number of monthly payments on the device 102, a defined length of time has passed since the purchase, or the like), the device 102 may be fully unlocked via a full unlock process 526, such that the user is enabled to transfer the device 102 to other brands (e.g., uninstalling the current brand-specific SIM from the device 102 and installing a SIM associated with a different brand in the device 102). In such cases, the configuration of the device 102 may be updated to be a device subsidy lock configuration 528 with an allowed list 530 that allows all brands 532.

Exemplary Operating Environment

Figure 6:
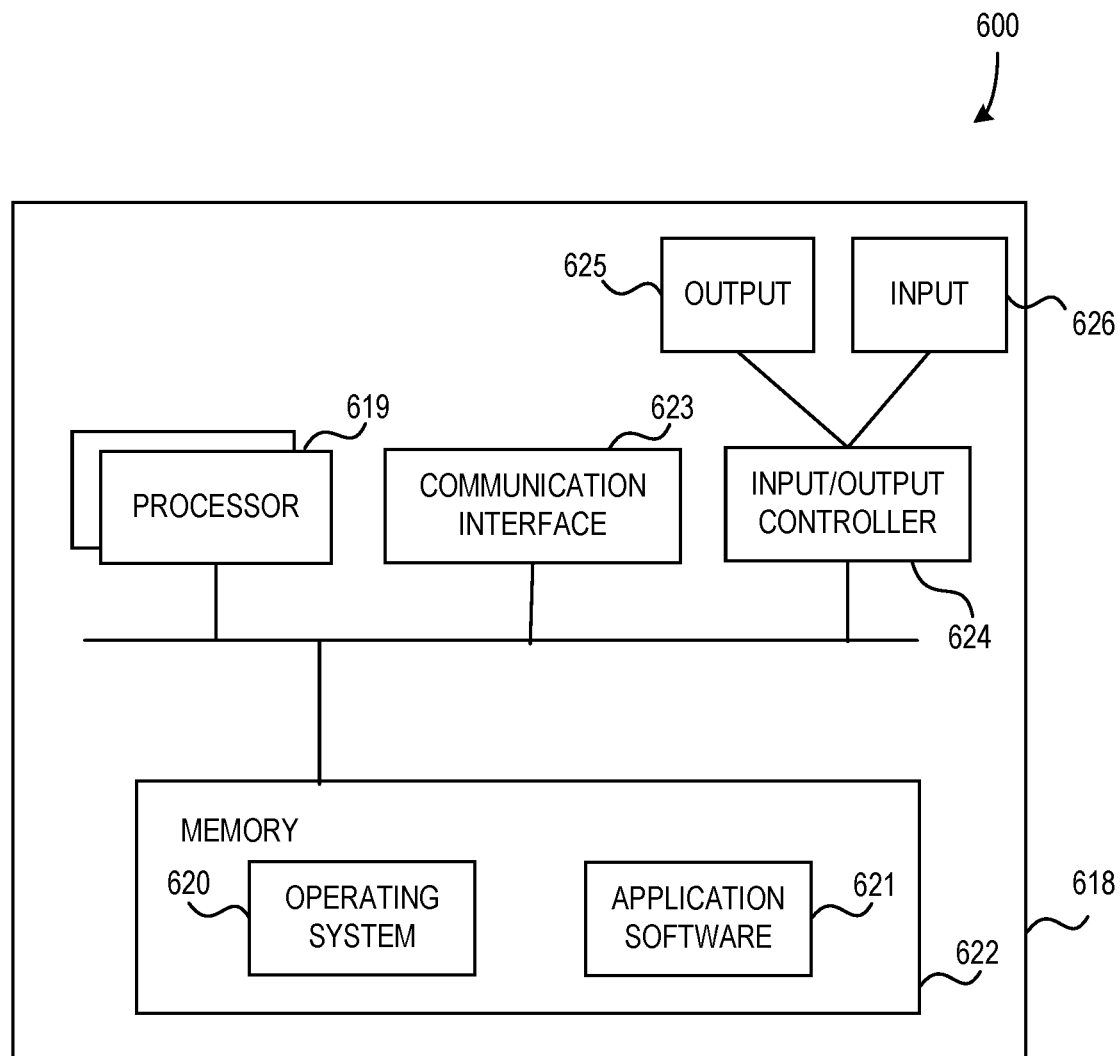
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, managing the activation and branding of adaptively branded devices using a policy server as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, random access memory (RAM), read-only memory (ROM), erasable programmable read-only memory (EPROM), electrically erasable programmable read-only memory (EEPROM), persistent memory, phase change memory, flash memory or other memory technology, compact disk read-only memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g., using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone, or a touchpad. In one embodiment, the output device 625 may also act as the input device. An example of such a device may be a touch sensitive display. The input/output controller 624 may also output data to devices other than the output device, e.g., a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system for managing activation of a device with a brand, the computer system comprising: a processor; and a non-transitory computer readable medium having stored thereon program code for transferring data to another computer system, the program code causing the processor to: receive a brand registration message from a device registration entity, the brand registration message including a device identifier of a device and a registered brand identifier of a brand; link the device identifier to the registered brand identifier in a device brand association data store; receive a device activation request from the device, the device activation request including the device identifier and a subscriber identity module (SIM) brand identifier of a SIM installed in the device; based on the SIM brand identifier differing from the registered brand identifier linked to the device identifier in the device brand association data store, prevent activation of the device with a brand of the registered brand identifier; and based on the SIM brand identifier matching the registered brand identifier linked to the device identifier in the device brand association data store, activate the device with the brand of the registered brand identifier, whereby the device is enabled to complete a branding process based on the brand.

An example computerized method for managing activation of a device with a brand, the method comprising: receiving, by a processor, a brand registration message from a device registration entity, the brand registration message including a device identifier of a device and a registered brand identifier of a brand; linking, by the processor, the device identifier to the registered brand identifier in a device brand association data store; receiving, by the processor, a device activation request from the device, the device activation request including the device identifier and a subscriber identity module (SIM) brand identifier of a SIM installed in the device; based on the SIM brand identifier differing from the registered brand identifier linked to the device identifier in the device brand association data store, preventing, by the processor, activation of the device with a brand of the registered brand identifier; and based on the SIM brand identifier matching the registered brand identifier linked to the device identifier in the device brand association data store, activating, by the processor, the device with the brand of the registered brand identifier, whereby the device is enabled to complete a branding process based on the brand.

A non-transitory computer storage medium having stored thereon program code executable by a first computer system at a first site, the program code embodying a method comprising: receiving a brand registration message from a device registration entity, the brand registration message including a device identifier of a device and a registered brand identifier of a brand; linking the device identifier to the registered brand identifier in a device brand association data store; receiving a device activation request from the device, the device activation request including the device identifier and a subscriber identity module (SIM) brand identifier of a SIM installed in the device; based on the SIM brand identifier differing from the registered brand identifier linked to the device identifier in the device brand association data store, preventing activation of the device with a brand of the registered brand identifier; and based on the SIM brand identifier matching the registered brand identifier linked to the device identifier in the device brand association data store, activating the device with the brand of the registered brand identifier, whereby the device is enabled to complete a branding process based on the brand.

Alternatively, or in addition to the other examples described herein, examples include any combination of the following:

wherein the device is configured to be compatible with a plurality of brands; and wherein activation of the device is further based on the brand of the registered brand identifier being included in the plurality of brands with which the device is compatible.

wherein the device is configured to include a subsidy lock allowed set of brand identifiers, the subsidy lock allowed set of brand identifiers including brand identifiers of the plurality of brand with which the device is configured to be compatible; and wherein activating the device includes adapting the subsidy lock allowed set of brand identifiers to include only the registered brand identifier, such that the device is locked into the brand of the registered brand identifier based on the subsidy lock allowed set of brand identifiers.

wherein the device is configured with a universal model identifier, wherein the universal model identifier identifies a model of the device with each brand of the plurality of brands with which the device is configured to be compatible.

further comprising: receiving, by the processor, a second device activation request from the device based on the device being reset to factory default configuration, the second device activation request including the device identifier and the SIM brand identifier of the SIM installed in the device; based on the SIM brand identifier differing from the registered brand identifier linked to the device identifier in the device brand association data store, preventing, by the processor, activation of the device with a brand of the registered brand identifier; and based on the SIM brand identifier matching the registered brand identifier linked to the device identifier in the device brand association data store, activating, by the processor, the device with the brand of the registered brand identifier, whereby the device is enabled to complete a branding process based on the brand.

further comprising: based on preventing activation of the device with the brand of the registered brand identifier, sending, by the processor, a verification failure message to the device; receiving, by the processor, a second device activation request from the device, the second device activation request including the device identifier and a second SIM brand identifier of a second SIM installed in the device; and based on the second SIM brand identifier matching the registered brand identifier linked to the device identifier in the device brand association data store, activate the device with the brand of the registered brand identifier, whereby the device is enabled to complete a branding process based on the brand.

further comprising: performing, by the processor, the branding process based on the brand of the registered brand identifier, to the device, wherein the branding process includes at least one of the following: activating a brand-specific software component of the device, installing brand-specific software to the device, and configuring brand-specific user experience features of the device.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for receiving, by a processor, a brand registration message from a device registration entity, the brand registration message including a device identifier of a device and a registered brand identifier of a brand; exemplary means for linking, by the processor, the device identifier to the registered brand identifier in a device brand association data store; exemplary means for receiving, by the processor, a device activation request from the device, the device activation request including the device identifier and a subscriber identity module (SIM) brand identifier of a SIM installed in the device; based on the SIM brand identifier differing from the registered brand identifier linked to the device identifier in the device brand association data store, exemplary means for preventing, by the processor, activation of the device with a brand of the registered brand identifier; and based on the SIM brand identifier matching the registered brand identifier linked to the device identifier in the device brand association data store, exemplary means for activating, by the processor, the device with the brand of the registered brand identifier, whereby the device is enabled to complete a branding process based on the brand.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for managing activation of a device with a brand, the method comprising:
   receiving, by a processor, a brand registration message from a device registration entity, the brand registration message including a device identifier of a device and a registered brand identifier of a brand;
   linking, by the processor, the device identifier to the registered brand identifier in a device brand association data store;
   receiving, by the processor, a device activation request from the device, the device activation request including the device identifier and a subscriber identity module (SIM) brand identifier of a SIM installed in the device;
   determining, by the processor, that the SIM brand identifier matches the registered brand identifier linked to the device identifier in the device brand association data store; and
   activating, by the processor, the device with the brand of the registered brand identifier, whereby the device is enabled to complete a branding process based on the brand.

2. The computerized method of claim 1, wherein the device is configured to be compatible with a plurality of brands; and
   wherein activation of the device is based on the brand of the registered brand identifier being included in the plurality of brands with which the device is compatible.

3. The computerized method of claim 2, wherein the device is configured to include a subsidy lock allowed set of brand identifiers, the subsidy lock allowed set of brand identifiers including brand identifiers of the plurality of brands with which the device is configured to be compatible; and
   wherein activating the device includes adapting the subsidy lock allowed set of brand identifiers to include only the registered brand identifier, such that the device is locked into the brand of the registered brand identifier based on the subsidy lock allowed set of brand identifiers.

4. The computerized method of claim 2, wherein the device is configured with a universal model identifier, wherein the universal model identifier identifies a model of the device with each brand of the plurality of brands with which the device is configured to be compatible.

5. The computerized method of claim 1, further comprising:
   receiving, by the processor, a second device activation request from the device based on the device being reset to factory default configuration, the second device activation request including the device identifier and a second SIM brand identifier of a second SIM installed in the device;
   determining, by the processor, the second SIM brand identifier differs from the registered brand identifier linked to the device identifier in the device brand association data store;
   preventing, by the processor, activation of the device with a brand of the registered brand identifier; and
   sending, by the processor, a verification failure message to the device.

6. The computerized method of claim 1, further comprising:
   receiving, by the processor, a second device activation request from the device based on the device being reset to factory default configuration, the second device activation request including the device identifier and a second SIM brand identifier of a second SIM installed in the device;
   determining, by the processor, the second SIM brand identifier matches the registered brand identifier linked to the device identifier in the device brand association data store; and
   activating, by the processor, the device with the brand of the registered brand identifier, whereby the device is enabled to complete a branding process based on the brand.

7. The computerized method of claim 1, further comprising:
   performing, by the processor, the branding process based on the brand of the registered brand identifier to the device, wherein the branding process includes at least one of the following: activating a brand-specific software component of the device, installing brand-specific software to the device, and configuring brand-specific user experience features of the device.

8. A computer system for managing activation of a device with a brand, the computer system comprising:
   a processor; and
   a non-transitory computer readable medium having stored thereon program code for transferring data to another computer system, the program code causing the processor to:
   receive a brand registration message from a device registration entity, the brand registration message including a device identifier of a device and a registered brand identifier of a brand;
   link the device identifier to the registered brand identifier in a device brand association data store;
   receive a device activation request from the device, the device activation request including the device identifier and a subscriber identity module (SIM) brand identifier of a SIM installed in the device;

determine that the SIM brand identifier matches the registered brand identifier linked to the device identifier in the device brand association data store; and activate the device with the brand of the registered brand identifier, whereby the device is enabled to complete a branding process based on the brand.

9. The computer system of claim 8, wherein the device is configured to be compatible with a plurality of brands; and wherein the activation of the device is based on the brand of the registered brand identifier being included in the plurality of brands with which the device is compatible.

10. The computer system of claim 9, wherein the device is configured to include a subsidy lock allowed set of brand identifiers, the subsidy lock allowed set of brand identifiers including brand identifiers of the plurality of brands with which the device is configured to be compatible; and wherein activating the device includes adapting the subsidy lock allowed set of brand identifiers to include only the registered brand identifier, such that the device is locked into the brand of the registered brand identifier based on the subsidy lock allowed set of brand identifiers.

11. The computer system of claim 9, wherein the device is configured with a universal model identifier, wherein the universal model identifier identifies a model of the device with each brand of the plurality of brands with which the device is configured to be compatible.

12. The computer system of claim 8, wherein the program code further causes the processor to:

receive a second device activation request from the device based on the device being reset to factory default configuration, the second device activation request including the device identifier and a second SIM brand identifier of a second SIM installed in the device;

determine the second SIM brand identifier differs from the registered brand identifier linked to the device identifier in the device brand association data store;

prevent activation of the device with a brand of the registered brand identifier; and send a verification failure message to the device.

13. The computer system of claim 8, wherein the program code further causes the processor to:

receive a second device activation request from the device based on the device being reset to factory default configuration, the second device activation request including the device identifier and a second SIM brand identifier of a second SIM installed in the device;

determine the second SIM brand identifier matches the registered brand identifier linked to the device identifier in the device brand association data store; and activate the device with the brand of the registered brand identifier, whereby the device is enabled to complete a branding process based on the brand.

14. The computer system of claim 8, wherein the program code further causes the processor to:

perform the branding process based on the brand of the registered brand identifier, to the device, wherein the branding process includes at least one of the following: activating a brand-specific software component of the device, installing brand-specific software to the device, and configuring brand-specific user experience features of the device.

15. A computer storage medium having stored thereon program code executable by a first computer system at a first site, the program code embodying a method comprising:

receiving a brand registration message from a device registration entity, the brand registration message including a device identifier of a device and a registered brand identifier of a brand;

linking the device identifier to the registered brand identifier in a device brand association data store;

receiving a device activation request from the device, the device activation request including the device identifier and a subscriber identity module (SIM) brand identifier of a SIM installed in the device;

determining that the SIM brand identifier differs from the registered brand identifier linked to the device identifier in the device brand association data store; and preventing activation of the device with the brand of the registered brand identifier.

16. The computer storage medium of claim 15, wherein the device is configured to be compatible with a plurality of brands; and wherein determining that the SIM brand identifier differs from the registered brand identifier linked to the device identifier in the device brand association data store further includes determining that a brand identified by the SIM brand identifier is not included in the plurality of brands with which the device is configured to be compatible.

17. The computer storage medium of claim 16, wherein the device is configured to include a subsidy lock allowed set of brand identifiers, the subsidy lock allowed set of brand identifiers including brand identifiers of the plurality of brand with which the device is configured to be compatible; and wherein determining that the SIM brand identifier differs from the registered brand identifier linked to the device identifier in the device brand association data store further includes determining that a brand identified by the SIM brand identifier is not included in the subsidy lock allowed set of brand identifiers.

18. The computer storage medium of claim 16, wherein the device is configured with a universal model identifier, wherein the universal model identifier identifies a model of the device with each brand of the plurality of brands with which the device is configured to be compatible.

19. The computer storage medium of claim 15, the embodied method further comprising:

receiving a second device activation request from the device based on the device being reset to factory default configuration, the second device activation request including the device identifier and a second SIM brand identifier of a second SIM installed in the device;

determining the second SIM brand identifier cannot be verified with a trusted source;

preventing activation of the device with a brand of the registered brand identifier; and sending a verification failure message to the device.

20. The computer storage medium of claim 15, the embodied method further comprising:

based on preventing activation of the device with the brand of the registered brand identifier, sending a verification failure message to the device;

receiving a second device activation request from the device, the second device activation request including the device identifier and a second SIM brand identifier of a second SIM installed in the device;

determining the second SIM brand identifier matches the registered brand identifier linked to the device identifier in the device brand association data store; and activating the device with the brand of the registered brand identifier, whereby the device is enabled to complete a branding process based on the brand.

\* \* \* \* \*